US012591652B1

(12) United States Patent
Kou et al.

(10) Patent No.: US 12,591,652 B1
(45) Date of Patent: Mar. 31, 2026

(54) SECURE PERSONAL INFORMATION SYSTEM INCLUDING PERSONAL INFORMATION OBJECTS

(71) Applicant: UIPCO, LLC, San Antonio, TX (US)

(72) Inventors: Qunying Kou, San Antonio, TX (US); Richard Macwayne Jones, Phoenix, AZ (US); William Preston Culbertson, II, Plant City, FL (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 261 days.

(21) Appl. No.: 18/192,097

(22) Filed: Mar. 29, 2023

Related U.S. Application Data

(60) Provisional application No. 63/325,762, filed on Mar. 31, 2022.

(51) Int. Cl.
*G06F 21/35* (2013.01)
*G06F 21/62* (2013.01)

(52) U.S. Cl.
CPC .......... *G06F 21/35* (2013.01); *G06F 21/6245* (2013.01)

(58) Field of Classification Search
CPC ...... G06F 21/35; G06F 21/6245; G06F 21/60; G06F 21/604; G06F 21/62; G06F 21/6218; G06F 21/34
See application file for complete search history.

(56) References Cited

U.S. PATENT DOCUMENTS

| | | | | |
|---|---|---|---|---|
| 8,478,195 | B1 * | 7/2013 | Hewinson | H04B 5/77 455/410 |
| 10,440,014 | B1 * | 10/2019 | Hoyer et al. | H04L 63/0853 713/162 |
| 10,630,829 | B1 * | 4/2020 | Kalama | H04M 1/72409 |
| 10,657,754 | B1 * | 5/2020 | Osborn | G06K 19/07749 |
| 2003/0095044 | A1 * | 5/2003 | Lin | G08B 13/1427 340/568.2 |
| 2011/0312270 | A1 * | 12/2011 | White | H04B 5/48 455/41.1 |
| 2012/0329388 | A1 * | 12/2012 | Royston | G06F 21/35 455/41.1 |

(Continued)

FOREIGN PATENT DOCUMENTS

| | | | | | |
|---|---|---|---|---|---|
| EP | | 2541978 A1 * | 1/2013 | ............ | G06F 21/35 |
| EP | | 3734488 A1 * | 11/2020 | ............ | G06F 21/33 |

(Continued)

OTHER PUBLICATIONS

Authors: Utsav Jambusariaa, Neerja Katwalaa, Dharmeshkumar Mistrya Title: "Secure Smartphone Unlocking using NFC", International Conference on Advanced Computing Technologies and Applications (ICACTA) Published: 2015 (Year: 2015).*

*Primary Examiner* — William R Korzuch
(74) *Attorney, Agent, or Firm* — Plumsea Law Group, LLC

(57) ABSTRACT

A secure personal information system with personal information objects is disclosed. The system comprises a personal information sticker or personal information magnet that can be attached to a mobile phone. The system also includes a secure access application running on the mobile phone, which can securely retrieve information from the personal information sticker or magnet.

14 Claims, 8 Drawing Sheets

(56)     References Cited

U.S. PATENT DOCUMENTS

| | | | |
|---|---|---|---|
| 2013/0057392 A1* | 3/2013 | Bullock .................. | G06K 7/01 340/10.5 |
| 2013/0298226 A1* | 11/2013 | Fang ...................... | G06F 21/35 726/20 |
| 2014/0113549 A1* | 4/2014 | Beg ........................ | H04W 4/12 455/41.1 |
| 2014/0327518 A1* | 11/2014 | Loutit .................... | G06F 3/048 340/7.58 |
| 2015/0019892 A1* | 1/2015 | Agrawal ................. | H04B 5/24 713/323 |
| 2015/0281227 A1* | 10/2015 | Fox Ivey ............. | H04L 9/3226 713/168 |
| 2015/0363586 A1* | 12/2015 | Klevan ............... | G06F 21/6245 726/19 |
| 2016/0188547 A1* | 6/2016 | Cruzada ............... | G06F 40/186 715/749 |
| 2016/0380464 A1* | 12/2016 | Chin ...................... | H02J 50/80 320/108 |
| 2017/0250808 A1* | 8/2017 | Jordahl ................. | H04L 9/3271 |
| 2018/0121684 A1* | 5/2018 | Goldberg ............. | G06F 21/445 |
| 2018/0130548 A1* | 5/2018 | Fisher ................. | G06Q 20/3227 |
| 2018/0202601 A1* | 7/2018 | Kelly ................... | F16M 11/041 |
| 2018/0218124 A1* | 8/2018 | Gorelick ............... | G16H 10/65 |
| 2019/0213465 A1* | 7/2019 | Avrahami ............. | G10L 15/197 |
| 2020/0090168 A1* | 3/2020 | Mossler ............... | G06Q 20/409 |
| 2022/0091949 A1* | 3/2022 | Chen .................... | G06F 11/2221 |
| 2022/0414205 A1* | 12/2022 | Klapman ............. | G06F 21/602 |
| 2023/0106925 A1* | 4/2023 | Chisu ................ | G01C 21/3453 701/23 |

FOREIGN PATENT DOCUMENTS

| | | | | |
|---|---|---|---|---|
| WO | WO-2011010970 A1 * | 1/2011 | ............ | G06F 21/35 |
| WO | WO-2021021373 A1 * | 2/2021 | ............ | G06F 21/32 |

* cited by examiner

11:37    ⊙ ⓒ ⊿ll 98% 🔋

PLEASE REATTACH
MOBILE ID TO
UNLOCK DEVICE

102

102

150

SECURE PERSONAL INFORMATION SYSTEM INCLUDING PERSONAL INFORMATION OBJECTS

CROSS-REFERENCE TO RELATED APPLICATIONS

This application claims the benefit of Provisional Patent Application No. 63/325,762 filed Mar. 31, 2022, and titled "Secure Personal Information System Including Personal Information Objects," which is incorporated by reference herein in its entirety.

TECHNICAL FIELD

The present disclosure generally relates to mobile phones and in particular to objects that can be attached to mobile phones.

BACKGROUND

Concerns over the security of user information, including digital identification, is growing. Many mobile devices store user information, including digital identification, in the cloud, and users of the mobile devices may have concerns that this data could be hacked and obtained by unauthorized users. Storing personal information directly on a device can also be problematic, since users tend to change devices frequently, and users have concerns that data may remain on a discarded device, or may not be easily transferable to a new device.

There is a need in the art for a system and method that addresses the shortcomings discussed above.

SUMMARY

In one aspect, a secure personal information system for use with a mobile phone includes a personal information sticker configured to be attached to the mobile phone. The personal information sticker includes a sticker body having a surface with an adhesive, a memory component storing personal information, the memory component being embedded in the sticker body, and a communication component embedded within the sticker body. The system also includes a secure access application configured to run on the mobile phone, where the secure access application is configured to establish a wireless connection between the mobile phone and the communication component of the personal information sticker, retrieve personal information from the memory component of the personal information sticker and pass the personal information to another application running on the mobile phone, and communicate with an operating system of the mobile device to disable the mobile device when the secure access application cannot establish a wireless connection with the communication component.

In another aspect, a secure personal information system for use with a mobile phone includes a personal information magnet configured to be attached to the mobile phone. The personal information magnet includes a magnet body having a magnetic surface, a memory component storing personal information, the memory component being embedded in the magnet body, and a communication component embedded within the magnet body. The system also includes a secure access application configured to run on the mobile phone, where the secure access application is configured to establish a wireless connection with the communication component of the personal information magnet, retrieve personal information from the memory component of the personal information magnet and pass the personal information to another application running on the mobile phone, and communicate with an operating system of the mobile device to disable the mobile device when the secure access application cannot establish a wireless connection with the communication component.

In another aspect, an assembly for use with a mobile phone includes a phone case configured to attach to the mobile phone, where the phone case includes a ferromagnetic material. The assembly also includes a personal information magnet that can be magnetically adhered to the phone case. The personal information magnet further includes a magnet body including a magnetic surface, a memory component storing personal information, the memory component being embedded in the magnet body, and a communication component embedded within the magnet body.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a secure personal information system and a method of use. The secure personal information system further includes a personal information object and a secure access application configured to run on a mobile device, such as a mobile phone. The personal information object can be removably attached to the mobile device, and the secure access application can retrieve data stored on the personal information object using a short-range network such as a near-field communication network. The personal information object can store digital identification information, contact information, or other suitable personal information that a user wants to keep secure.

To facilitate enhanced security, the embodiments use a combination of short-range communication, encryption, and authentication tokens. The secure access application checks for a connection with the personal information object over the short-range network. The system also checks for, and verifies, an authorization token stored in memory on the personal information object. If there is no connection and/or token verification fails, the mobile phone can be disabled to prevent use by someone without the personal information object. In some cases, data on the personal information object may be encrypted and the secure access application can request a user password (or retrieve a locally stored key) for decryption. Using multiple security layers in this manner reduces the risk that unauthorized users could retrieve the user's personal information from the personal information object.

Figure 1:
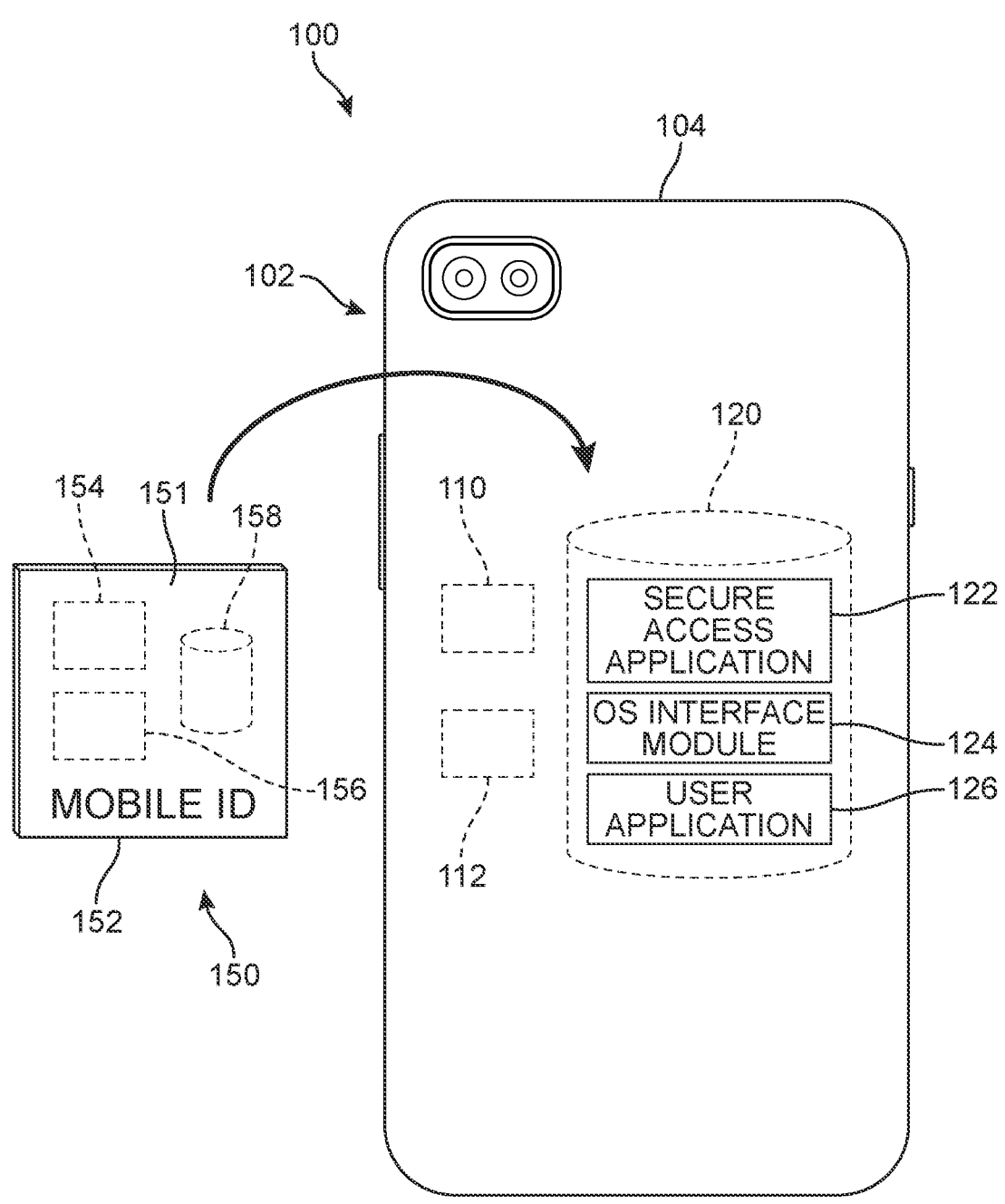
FIG. 1 is a schematic view of a secure personal information system, including a personal information magnet, according to an embodiment.

FIG. 1 is a schematic view of a secure personal information system 100 ("system 100"). System 100 may further comprise a personal information magnet 150 ("magnet 150") and a secure access application 122 that is configured to run on an external device and that may be used to retrieve information stored on magnet 150.

Magnet 150 may comprise a magnet housing 152 that has a substantially narrow thickness compared to its length and width. In FIG. 1, a first side 151 of magnet 150 may be visible. Embedded within magnet housing 152 may be one or more electronic components, including processors 154 and a wireless networking component 156. Additionally, magnet housing 152 may house a memory component 158. Memory component 158 can store various kinds of information, including digital identification information, user contacts, and other kinds of personal information. In some cases, memory component 158 could also store instructions executable by processors 154.

In the exemplary embodiment, magnet 150 is branded with the name "Mobile ID," however in other embodiments magnet 150 may not be branded as such.

Mobile phone 102 can be comprised of a mobile phone housing 104 that houses various hardware components. As seen in FIG. 1, a mobile phone 102 may comprise processors 110, memory 120, and a wireless networking component 112. Memory 120 stores various modules that include instructions that can be executed by processors 110. In the exemplary embodiment, memory 120 may store secure access application 122, an OS interface module 124 and one or more user applications 126.

User applications 126 may comprise any number of applications run on mobile phone 102, including applications that require a user to enter personal information and/or digital identification information. Examples of user applications include mobile browsers, shopping applications, and banking applications.

Secure access application 122 comprises an application that can interface with magnet 150 and retrieve information stored in memory component 158 of magnet 150. Whenever any user application running on mobile phone 102 requires personal information and/or digital identification, secure access application 122 can automatically retrieve the required information and send the information to application 124. As described above, this eliminates the need to have personal information for the user stored in the cloud, or directly on the mobile phone itself. Moreover, as described in further detail below, the information stored on memory component 158 may be encrypted so that even if magnet 150 is lost or stolen, the personal information cannot be obtained by unauthorized users.

Communication between magnet 150 and mobile phone 102 may be facilitated by a short-range wireless network. In one embodiment, communication can be established using near-field communication (NFC) implemented by wireless networking component 156 of magnet 150 and by wireless networking component 112 of mobile phone 102. Thus, in some embodiments, wireless networking component 112 may comprise an NFC initiator, while wireless networking component 156 of magnet 150 may comprise part of an NFC target. An NFC initiator generates a radio frequency field that can power a passive NFC target. The NFC target may include a memory component and an RF antenna. It may be appreciated, however, that in other embodiments any other suitable short-range wireless network could be used.

By utilizing a short-range network, such as a near-field communication network, the embodiments ensure that data stored on magnet 150 cannot be retrieved by remote devices that gain unauthorized access to the device over relatively longer-range networks, such as a local area network, or wide area network.

Figure 2:
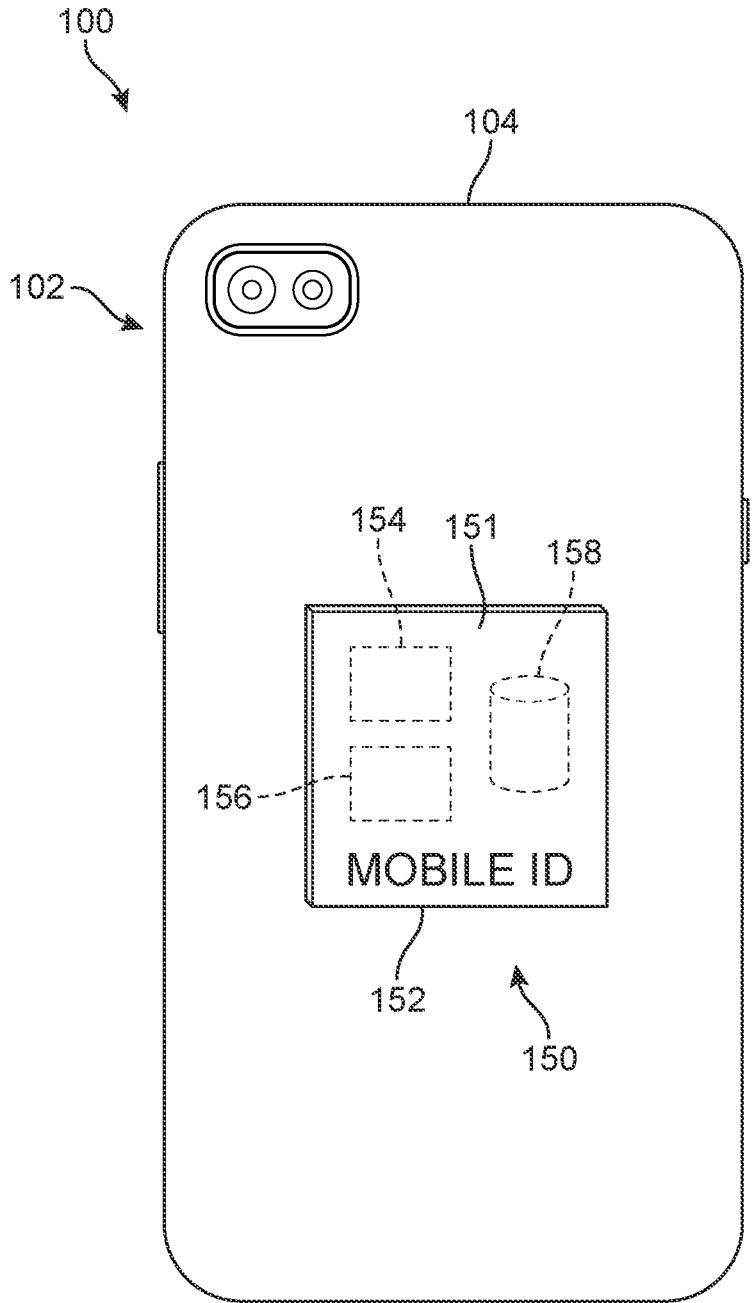
FIG. 2 is a schematic view of a personal information magnet attached to a mobile phone, according to an embodiment.

As indicated in FIG. 2, magnet 150 is intended to be removably attached to mobile phone 102. This allows information to be easily retrieved from magnet 150 for use in applications running on mobile phone 102.

Figure 3:
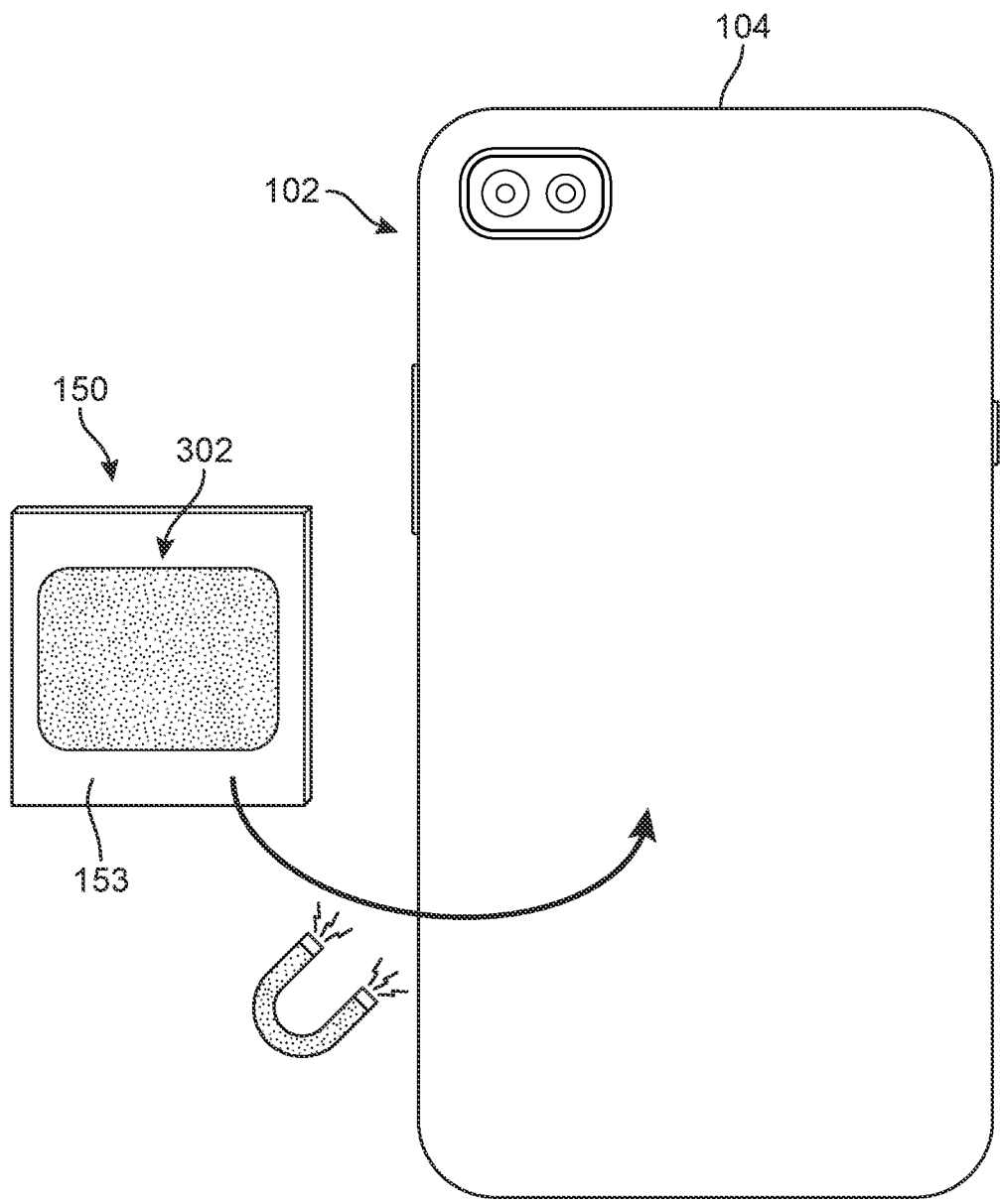
FIG. 3 is a schematic view of a personal information magnet including a magnetic surface for attaching to a mobile phone, according to an embodiment.

Magnet housing 152 may or may not be itself magnetic. In some embodiments, magnet housing 152 incorporates at least one magnetic portion 302 on an opposing side 153 of magnet 150, as shown in FIG. 3.

In some embodiments, a mobile phone housing could comprise a ferromagnetic material, such that personal information magnet may adhere directly to the phone housing. However, in other embodiments, where a phone housing is made of nonferromagnetic materials such as plastic and/or glass, an external phone case including ferromagnetic materials could be used.

Figure 4:
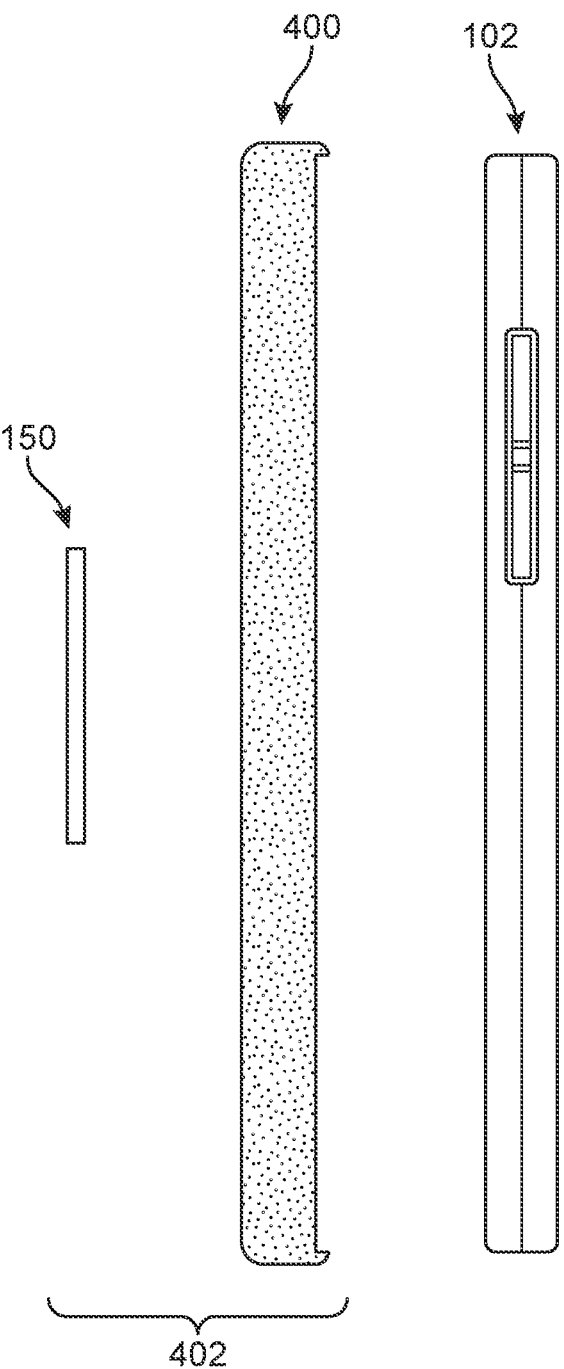
FIG. 4 is a schematic view of an assembly comprised of a phone case and a personal information magnet, along with a mobile phone, according to an embodiment.

In FIG. 4, for example, an assembly 402 could comprise both a mobile phone case 400 along with magnet 150. Mobile phone case 400 may be comprised of a ferromagnetic material that magnet 150 can be adhered to. Thus, when case 400 is placed onto mobile phone 102, magnet 150 may be disposed sufficiently close to mobile phone 102 to enable near-field communication between wireless network component 156 (of magnet 150) and wireless network component 112 (of mobile phone 102).

In some cases, the ferromagnetic material in phone case 400 could interfere with near-field communication between magnet 150 and mobile phone 102. To mitigate this, some embodiments could include a cut-out, or opening, in the phone case that is immediately adjacent the corresponding NFC or other short-range networking component in the phone (for example, adjacent component 112 in FIG. 1). So long as the opening is not larger than magnet 150, or than the magnetic surface of magnet 150, magnet 150 may still attach to the phone case while allowing radio waves to pass between magnet 150 and phone 102 through the opening in the phone case.

Figure 5B:
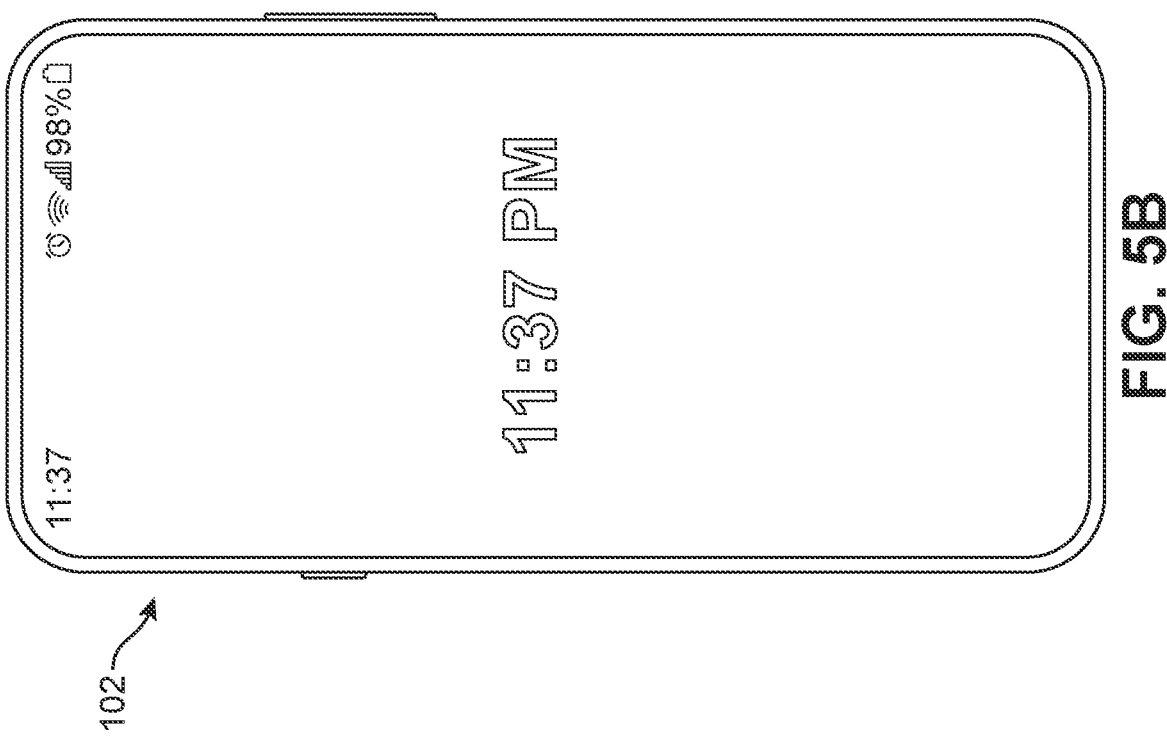
FIGS. 5A-5B are schematic views of a personal information object attached to a mobile phone, according to an embodiment.
Figure 5A:
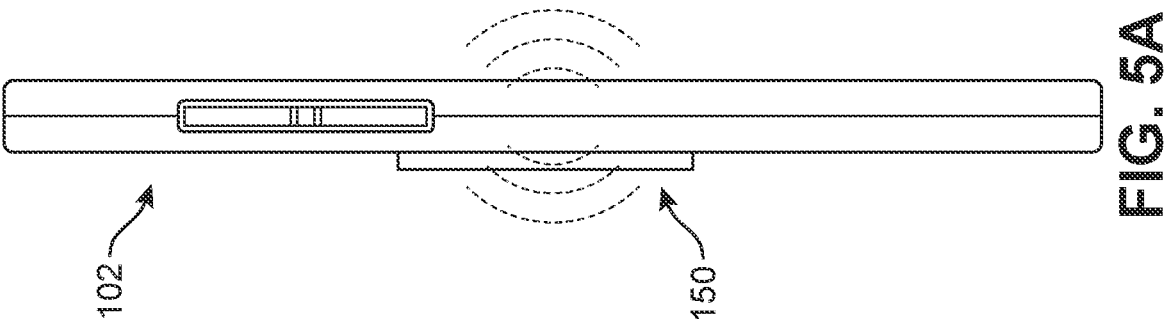

The embodiments can incorporate a safety mechanism so that a mobile phone cannot be used when a personal information object is not attached to, or located sufficiently close to, a mobile phone. This can be accomplished by having security access application 122, configured to run on mobile phone 102, check periodically to confirm that there is a wireless connection between mobile phone 102 and magnet 150. If there is a wireless connection, which occurs as long as magnet 150 is sufficiently close to mobile phone 102, mobile phone 102 operates as normal, as seen in FIGS. 5A-B. As used herein, a personal information object is "sufficiently close" to a mobile device if their respective communication components are within the operating distance of near-field communication, which is on the order of 4 centimeters or less.

Figure 6B:
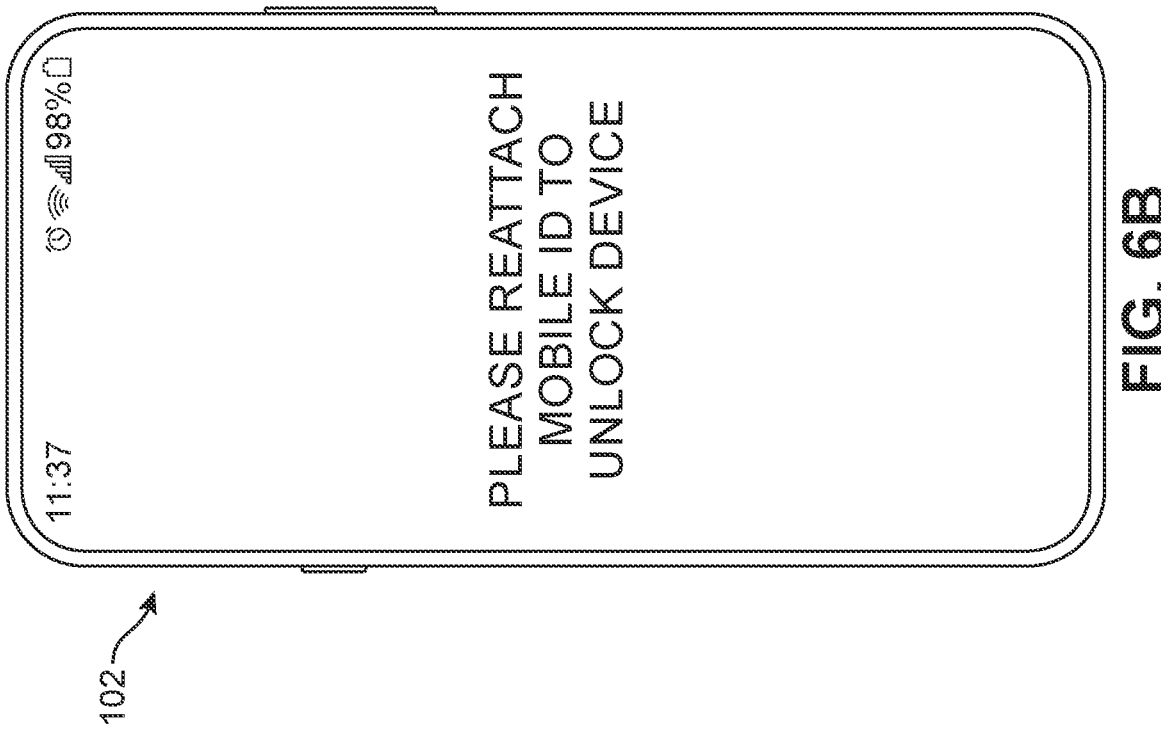
FIGS. 6A-6B are schematic views of a personal information object separated from a mobile phone, according to an embodiment.
Figure 6A:
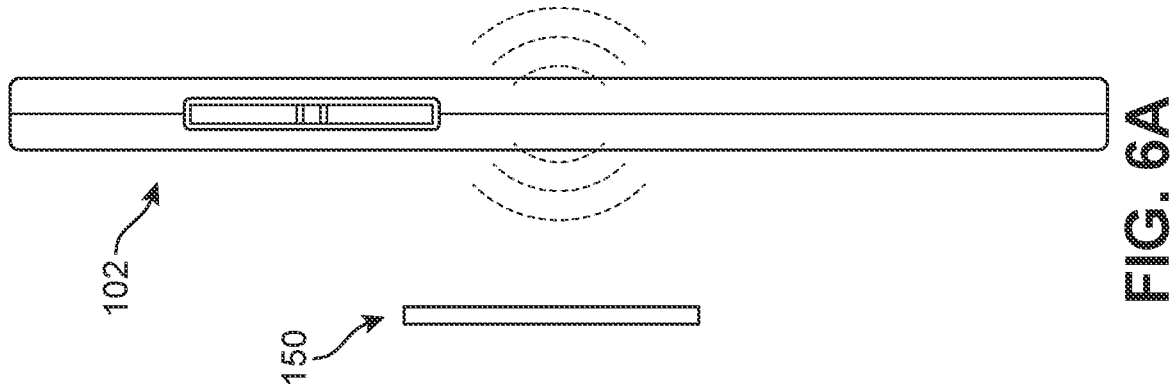

By contrast, in FIG. 6A magnet 150 is located outside of the operating distance of the NFC network, and therefor secure access application 122 determines that there is no connection with magnet 150. In this case, mobile phone 102 can be disabled. To disable the mobile phone, security access application 122 may send information to the phone's operating system using OS interface module 124, indicating that a required security configuration has not been met (namely the personal information magnet is not attached). In some embodiments, the mobile phone's operating system could be pre-programmed to enable such deactivation via instructions from secure access application 122. As seen in FIG. 6B, when disabled, mobile phone 102 could display a message, such as "Please Reattach Mobile ID to Unlock Device."

In another embodiment, a personal information object could take the form of a personal information sticker. As with the personal information magnet, a personal information sticker may have a sticker body that embeds processors, wireless communication components, and memory for storing personal information (and/or suitable applications to be run by the processors).

Figure 7:
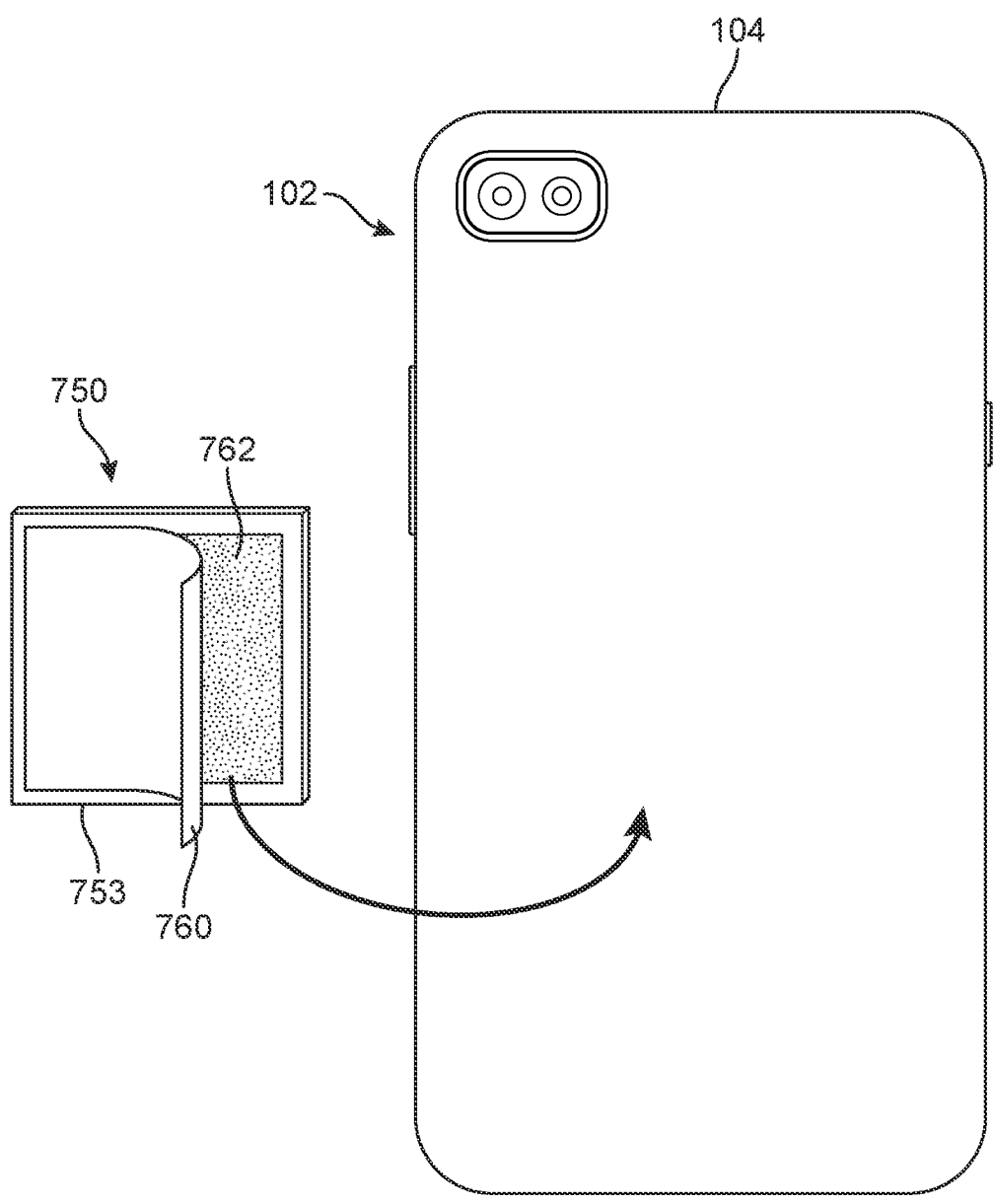
FIG. 7 is a schematic view of a personal information sticker including an adhesive for attaching to a mobile device, according to an embodiment.

FIG. 7 is a schematic view of a personal information sticker 750 that could be attached to housing 104 of mobile phone 102. Specifically, sticker 750 comprises an adhesive 762 on a surface 453. A user could remove a backing paper 760 to expose adhesive 762, thereby allowing sticker 750 to be attached to housing 104.

To facilitate additional security, the embodiments can include additional features that reduce the chances of unauthorized users gaining access to personal information that may be stored on a personal information object. In some embodiments, therefore, all data stored on a personal information object may be encrypted. The decryption key can either be stored directly on the mobile phone, or may be maintained by the user who can enter the key (or password) when prompted by the system.

Furthermore, to prevent spoofing an NFC connection in order to keep the device from deactivating, embodiments may also make use of an authorization token that could be stored in memory on the personal information object. Thus, when checking for an NFC connection, the secure access application may also retrieve the authorization token, which may be specific to a particular user/mobile phone, and confirm its validity.

Figure 8:
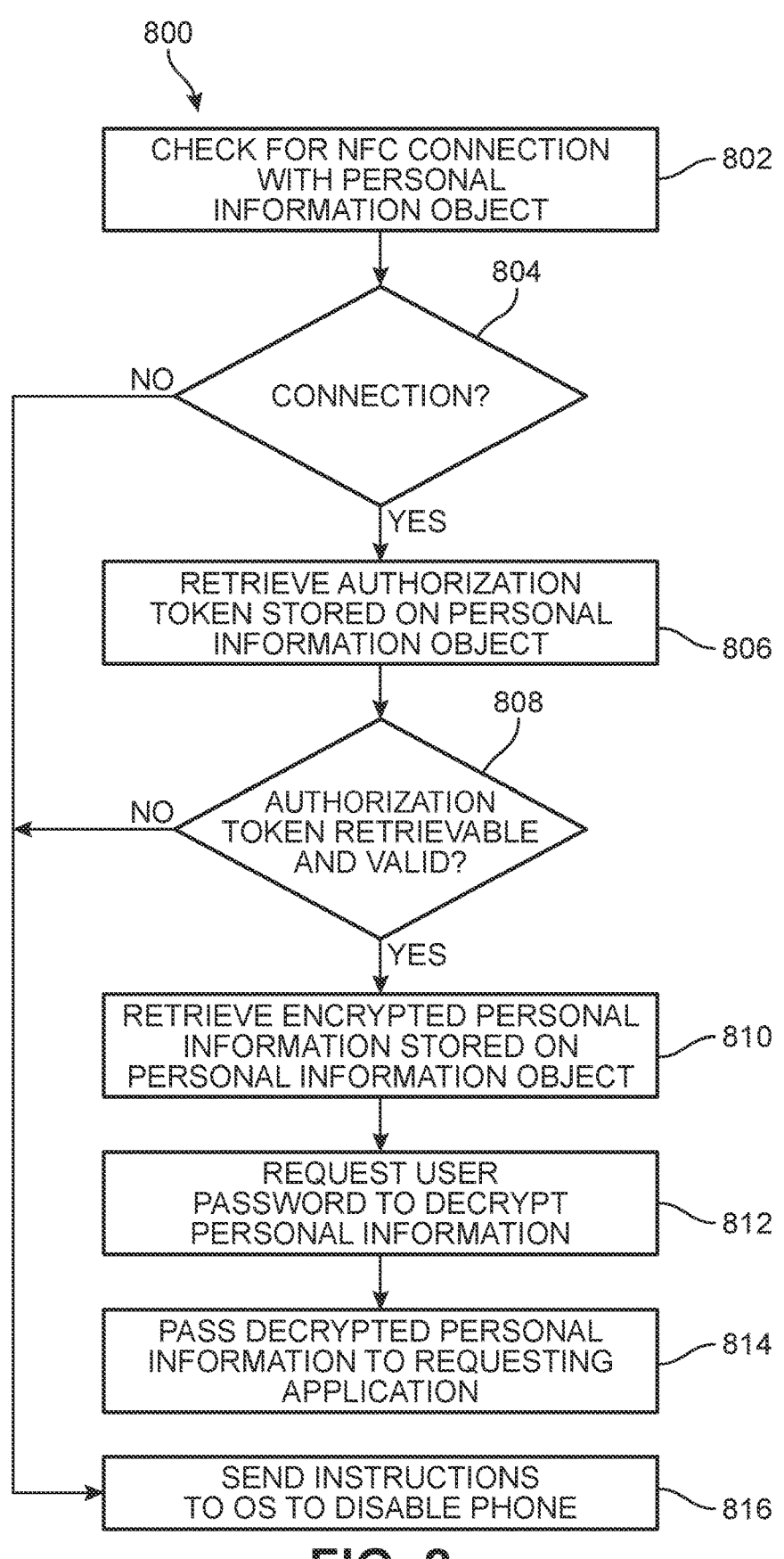
FIG. 8 is a schematic view of a method for a secure access application in communication with a personal information object, according to an embodiment.

FIG. 8 is a schematic view of a general security process that can be performed by the secure access application. Starting in step 802, the application may check for an NFC connection with a personal information object, such as a magnet or sticker. If, at step 804, no connection is detected, the system proceeds to step 816 to deactivate the mobile phone until a connection has been detected. As used herein, the term "deactivate" refers to locking a user out of some or all functionality of a mobile phone.

If, at step 804, a connection is detected, the system proceeds to step 806 to retrieve an authorization token stored on the personal information object. Then in step 808, the application checks that the token has been retrieved and is valid. If the token is not valid (or cannot be retrieved), the application proceeds to step 816. Otherwise, the system continues to step 810. In step 810, the application retrieves encrypted personal information stored on the personal information object. In some cases, the application retrieves only a subset of the stored data, according to requests from various applications on the mobile phone. In other cases, all the personal information can be retrieved during this step.

In step 812, a user password to decrypt the personal information is requested. If the correct password is received in step 812, the application proceeds to decrypt the personal information and pass it to any requestion applications in step 814. It may be appreciated that if the user does not provide the correct password in step 812, after some predetermined number of attempts, the system may message the requesting applications that the requested information cannot be retrieved.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A secure personal information system for use with a mobile phone, comprising:
  a personal information sticker configured to be attached to the mobile phone, the personal information sticker further comprising:
    a sticker body including a surface with an adhesive;
    a memory component storing personal information, the memory component being embedded in the sticker body;
    a near field communication component embedded within the sticker body; and
  a secure access application configured to run on the mobile phone, wherein the secure access application is configured to:
    establish a near field communication connection between the mobile phone and the communication component of the personal information sticker;
    retrieve personal information from the memory component of the personal information sticker and pass the personal information to another application running on the mobile phone; and
    communicate with an operating system of the mobile phone to disable the mobile phone when the secure access application cannot establish the near field communication connection with the communication component of the personal information sticker.

2. The secure personal information system according to claim 1, wherein the near field communication component and the memory component together comprise a near field communication tag.

3. The secure personal information system according to claim 2, wherein the near field communication connection is broken whenever the personal information sticker is moved further than four centimeters from the mobile phone.

4. The secure personal information system according to claim 1, wherein the personal information stored in the memory component comprises digital identification information.

5. The secure personal information system according to claim 1, wherein the personal information stored on the memory component is encrypted.

6. The secure personal information system according to claim 5, wherein the secure access application requires a password to decrypt the encrypted personal information.

7. The secure personal information system according to claim 1, wherein the personal information sticker includes an authentication token stored in the memory component.

8. A secure personal information system for use with a mobile phone, comprising:
  a personal information magnet configured to be attached to the mobile phone, the personal information magnet further comprising:
  a magnet body including a magnetic surface;
  a memory component storing personal information, the memory component being embedded in the magnet body;
  a near field communication component embedded within the magnet body; and
    a secure access application configured to run on the mobile phone, wherein the secure access application is configured to:
    establish a near field communication connection with the communication component of the personal information magnet;
    retrieve personal information from the memory component of the personal information magnet and pass the personal information to another application running on the mobile phone; and
  communicate with an operating system of the mobile phone to disable the mobile phone when the secure access application cannot establish the near field communication connection with the communication component of the personal information magnet.

9. The secure personal information system according to claim 8, wherein the near field communication component and the memory component together comprise a near field communication tag.

10. The secure personal information system according to claim 9, wherein the near field communication connection is broken whenever the personal information magnet is moved further than four centimeters from the mobile phone.

11. The secure personal information system according to claim 8, wherein the personal information stored in the memory component comprises digital identification information.

12. The secure personal information system according to claim 8, wherein the personal information stored on the memory component is encrypted.

13. The secure personal information system according to claim 12, wherein the secure access application requires a password to decrypt the encrypted personal information.

14. The secure personal information system according to claim 8, wherein the personal information magnet includes an authentication token stored in the memory component.

* * * * *